(12) United States Patent
Pin-Chien

(10) Patent No.: US 6,400,354 B1
(45) Date of Patent: Jun. 4, 2002

(54) POINTING STICK DEVICE THAT CAN EFFECTIVELY SENSE PRESSURE FROM ITS CAP

(75) Inventor: Liao Pin-Chien, Tao-Yuan (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 09/546,320

(22) Filed: Apr. 7, 2000

(30) Foreign Application Priority Data

Aug. 27, 1999 (TW) .......................................... 88114766

(51) Int. Cl.⁷ ................................................ G09G 5/08
(52) U.S. Cl. ........................................ 345/161; 290/6 A
(58) Field of Search ................................. 345/161, 162, 345/156, 157, 159, 160, 158, 163, 167; 200/5 R, 6 R, 6 A; 74/471 XY

(56) References Cited

U.S. PATENT DOCUMENTS 5,043,709 A * 8/1991 Kim ............................ 345/161
5,754,167 A * 5/1998 Narusawa et al. ........... 345/161
6,189,401 B1 * 2/2001 Atwell et al. ................ 345/161
6,266,046 B1 * 7/2001 Arita ........................... 345/161

* cited by examiner

Primary Examiner—Xiao Wu
(74) Attorney, Agent, or Firm—Winston Hsu

(57) ABSTRACT

The present invention relates to a pointing stick device. The pointing stick device comprises a base plate, a stick, a cap and a base stand. The bottom end of the stick is vertically mounted in a hole in the base plate, and a plurality of strain gauges are installed around the middle portion of the stick to sense pressure and generate corresponding sensing signals. The cap has a cone-shaped mouth to contain the top end of the stick and the middle portion of the stick. The base stand, of a cone shape to match the mouth of the cap, covers the middle portion of the stick. A plurality of strain gauges extend into the middle portion of the stick and are covered by the base stand so that the top ends of the strain gauges sense the pressure coming form cap, improving the sensitivity of the pointing stick device.

7 Claims, 3 Drawing Sheets

POINTING STICK DEVICE THAT CAN EFFECTIVELY SENSE PRESSURE FROM ITS CAP

BACKGROUND OF THE INVENTION

1. Field of the Invention

The present invention relates to a pointing stick device, and more particularly, to a pointing stick device that can effectively sense pressure from its cap.

2. Description of the Prior Art

A pointing stick device can control the movement and function of a cursor on a computer display. The pointing stick device is a common peripheral, used with both desktop and notebook computers. The cursor on the display can have three directions of movement: X, Y and Z. However, the pointing stick device can only control two of these directions, the X and the Y. Consequently, after setting the X and Y position of the cursor, the user must press a button to set the Z direction or to initiate a function.

It has grown increasingly important with pointing stick devices to increase the sensitivity in the X and Y directions, and add sensitivity in the Z direction. Sensitivity in the Z direction enables true 3-dimensional (3D) positioning of the cursor. The Z direction signal can also serve a button-like purpose, initiating functions. With the universality of 3D drawings and 3D animation, the prior art pointing stick device with only a 2-dimensional (2D) signal is no longer sufficient. Consequently, designing a pointing stick device with high sensitivity in the Z direction is very important.

Please refer to FIG. 1. FIG. 1 is a cross-sectional diagram of a prior art pointing stick device 10. The prior art pointing stick device comprises a column-shaped stick 12 for controlling the 2D movement of a cursor (not shown) on a display (not shown). The stick 12 comprises a top end 13, a bottom end 17 and a portion 15 between the top end 13 and the bottom end 17. The pointing stick device further comprises a cap 20 mounted on the top end 13 of the stick 12, a rubber cap 21 mounted on the cap 20 for the user's convenience, a substrate 30 containing an aperture 36 for fixing the stick 12, a plurality of strain gauges 22 for sensing pressure and generating corresponding sensing signals, a plurality of leads 24 connected to the lower end of the strain gauges 22, a plurality of traces 32 installed on the substrate 30 and soldered to the leads 24 to transmit the sensing signals of the strain gauges 22, a collar 28 mounted around the bottom 17 of the stick, and a bonding compound 26 filling the gap between the collar 28, the stick 12 and the substrate 30 for affixing the bottom 17 of the stick into the aperture 36 of the substrate 30.

Please refer to FIG. 2 and FIG. 3. FIG. 2 is a schematic diagram of the pointing stick device 10 under an external horizontal force. The dashed center-line indicates the bending direction of the stick. FIG. 3 is a schematic diagram of the pointing stick device 10 shown in FIG. 1 under an external vertical force. The dashed center-line indicates the direction of compression of the force. When the user pushes the rubber cap 21, the cap 20 pushes the stick 12. The stick 12 undergoes bending deformation and the strain gauges 22 sense the induced pressure. The collar 28 helps the strain gauges 22 sense the bending deformation via the bonding compound 26. When the horizontal force ($F_x$, $F_y$) bends the stick 12, the strain gauges 22 generate bending strain signals $S_{x1}$, $S_{y1}$. When the perpendicular force ($F_z$) presses on the stick 12, the strain gauges 22 generate a compressive strain signal $S_{z1}$.

The inner side of the cap 20 of the prior art pointing stick device 10 is a column-shaped mouth 23 and the corresponding portion 15 of the stick 12 is also column-shaped. Consequently, the strain signal $S_{z1}$, which corresponds to the Z direction compression force, is too weak to be used. When the external force pushes the cap 20, the strain gauges 22 are compressed by the substrate 30, the collar 28, and the bonding compound 26, so they can only generate corresponding 2D strain signals $S_{x1}$, $S_{y1}$. Moreover, the bending stress of the stick 12 is limited, which limits the sensitivity of the strain signal in the horizontal direction. Also, during assembly of the pointing stick device 10, installation of the bonding compound 26 and the collar 28 is difficult, which increases costs.

SUMMARY OF THE INVENTION

It is therefore a primary objective of the present invention to provide a pointing stick device that can effectively sense the pressure from its cap to solve the above mentioned problems.

In a preferred embodiment, the present invention relates to a pointing stick device comprising:

a base plate;

a stick having a top end, a bottom end, and a middle portion between the top end and bottom end, the bottom end of the stick being vertically installed at the base plate;

at least one strain gauge installed around the top end for sensing pressure and generating corresponding sensing signal;

a cap mounted at the top end of the stick and having a cone-shaped mouth at its lower end for containing the top end of the stick; and a base stand installed outside the middle portion of the stick and covering at least a portion of the strain gauge, a portion of the base stand being positioned inside the cone-shaped mouth of the cap;

wherein when an external force is applied to the cap, the force will be transmitted through the cone-shaped mouth of the cap to the portion of the base stand positioned inside the mouth and also to the strain gauge covered by the base stand wherein the strain gauge will sense the force from the cap and generate corresponding sensing signals.

It is an advantage of the present invention that it can provide a pointing stick device with increased sensitivity in the X and Y directions, and that can also effectively sense pressure in the Z direction from its cap.

These and other objectives of the present invention will no doubt become obvious to those of ordinary skill in the art after reading the following detailed description that is illustrated in the various figures and drawings.

DETAILED DESCRIPTION OF THE PREFERRED EMBODIMENT

Figure 1:
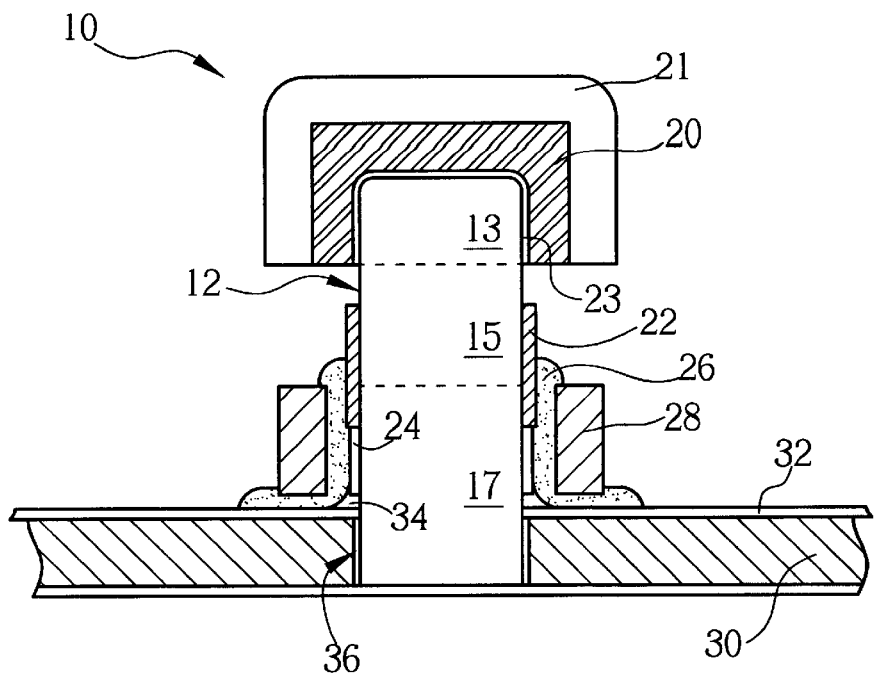
FIG. 1 is a cross-sectional diagram of a prior art pointing stick device 10.
Figure 2:
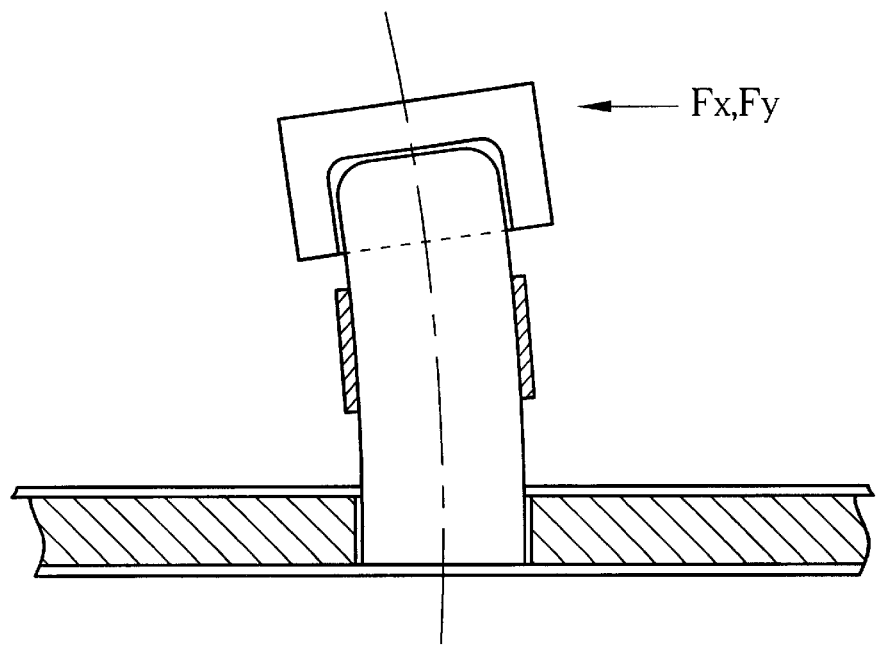
FIG. 2 is a schematic diagram of a prior art pointing stick device under an external horizontal force.
Figure 3:
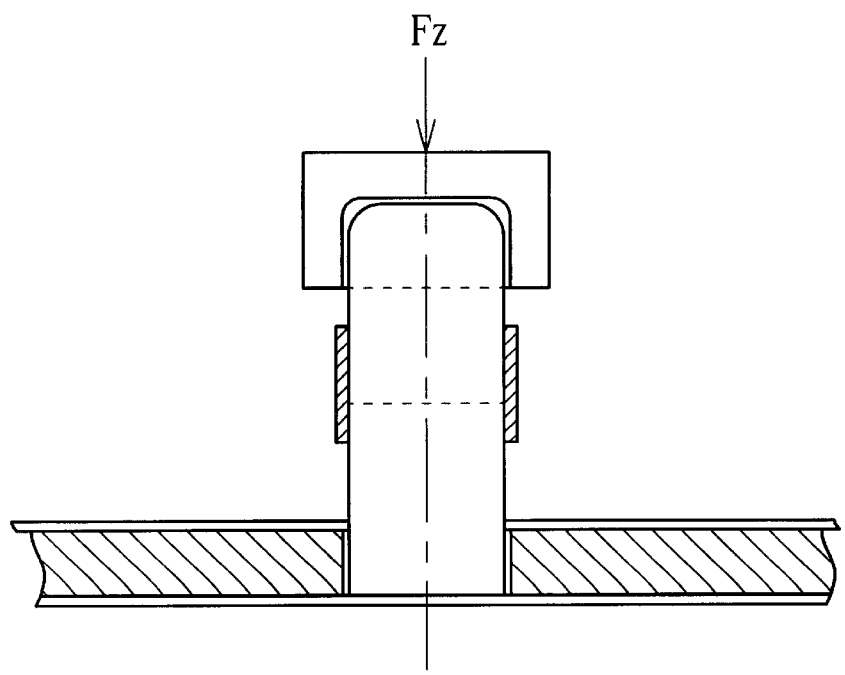
FIG. 3 is a schematic diagram of a prior art pointing stick device shown in FIG. 1 under an external vertical force.
Figure 4:
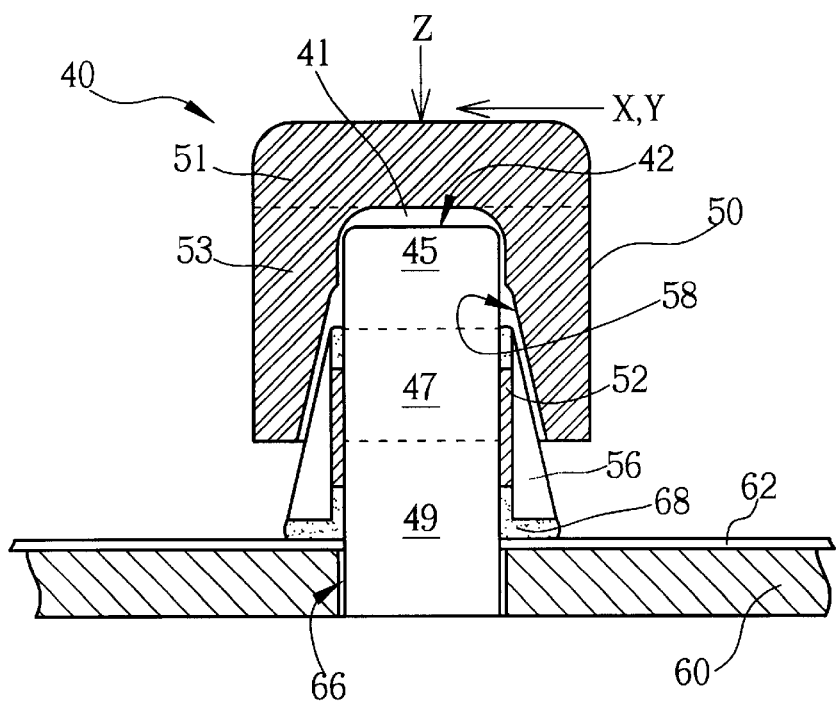
FIG. 4 is a cross-sectional diagram of a present invention pointing stick device.

Please refer to FIG. 4. FIG. 4 is a cross-sectional diagram of a present invention pointing stick device 40. The pointing stick device comprises a base plate 60, a stick 42, a cap 50, a base stand 56 and at least one strain gauge 52. The base plate 60 comprises a hole 66. The stick 42 has a top end 45, a bottom end 49, and a middle portion 47 between the top end 45 and bottom end 49. The bottom end 49 of the stick 42 is vertically installed in the hole 66 of the base plate 60. The cap 50 comprises an upper end 51 and a lower end 53, and a cone-shaped mouth 58 is installed at the lower end 53. The cone-shaped mouth 58 of the cap 50 is used to contain the top end 45 and the middle portion 47 of the stick. The cap 50 is installed at the top end 45 of the stick 42 with a gap 41, and is slightly movable so that the cap 50 can rotate a little around the top end 45 of the stick 42 when an external force is exerted on the cap 50. A rubber cup (not shown) can be mounted on the cap 50 for the user's convenience.

The base stand 56 is a ringed cone-shaped structure and is mounted around the middle portion of the stick and around a portion of the bottom end of the stick with a bonding compound 68. The external cone-shaped surface of the base stand 56 coincides with the internal cone-shaped mouth 58, which does not affect the relative motion between the cap 50 and the stick 42. Filling epoxy on the bottom 49 and middle portion 47 of the stick 42 can form the base stand 56, and the bonding compound 68 can then be omitted.

The horizontal cross-section of the stick 42 is nearly rectangular, and a strain gauge 52 is installed on each of the four faces of the stick 42 for sensing pressure from various directions and generating corresponding sensing signals. The top end of the strain gauge 52 extends to the middle portion 47 of the stick 42 and is covered by the base stand 56, enabling the top end of the strain gauge 52 to sense the pressure coming from the cap 50.

The base plate 60 is a printed circuit board (PCB), and comprises a plurality of wires 62. There are a plurality of leads (not shown) installed at the bottom of the plurality of strain gauges 52. The plurality of leads are soldered to the plurality of wires 62 so that the sensing signals generated by the strain gauges 52 can be transmitted to the base plate 60.

The direction of the external force applied to the pointing stick device can include both the horizontal and vertical directions. The arrow with the X and Y label in FIG. 4 indicates the two horizontal directions of an applied force. The arrow with Z label indicates the vertical direction of an applied force. By sensing both horizontal and vertical forces, the pointing stick device can control the 3D movement of a cursor on a display, or it can use the vertical sensing signals to emulate a button signal to initiate a function.

Figure 5:
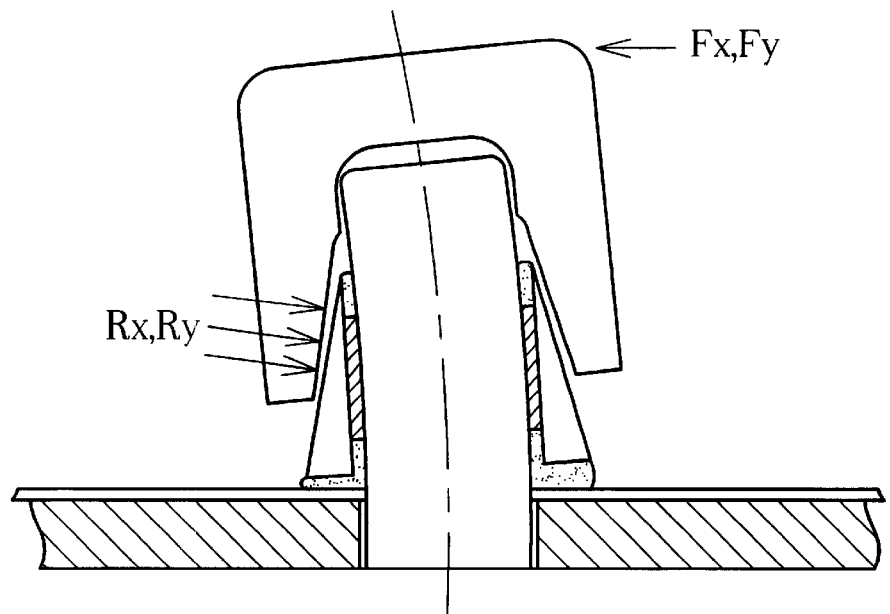
FIG. 5 is a schematic diagram of the present invention pointing stick device shown in FIG. 4 under an external horizontal force.

Please refer to FIG. 5. FIG. 5 is a schematic diagram of the pointing stick device of FIG. 4 under an external horizontal force. The center-line indicates the bending direction of the stick. When the horizontal force ($F_x$, $F_y$) bends the stick 42, the strain gauges 52 generate bending strain signals $S_{x1}$, $S_{y1}$. The gap 41 enables the cap 50 to turn a little bit so that the cone-shaped mouth 58 can apply a perpendicular force ($R_x$, $R_y$) to the strain gauges 52. This perpendicular force ($R_x$, $R_y$) compresses the strain gauges 52 to generate additional strain signals $S_{x2}$, $S_{y2}$. Hence, when the pointing stick device is pushed in the X and Y directions, it generates a total strain signal of $S_{x1}+S_{x2}$, $S_{y1}+S_{y2}$ in the horizontal direction, thereby increasing the sensitivity in horizontal direction.

Figure 6:
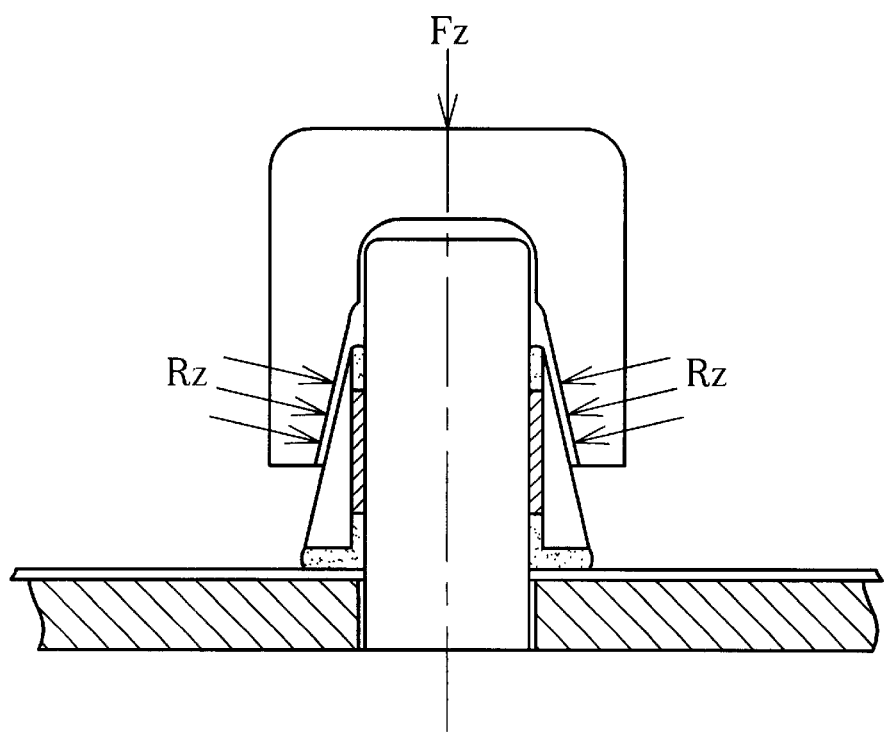
FIG. 6 is a schematic diagram of the present invention pointing stick device shown in FIG. 4 under an external vertical force.

Please refer to FIG. 6. FIG. 6 is a schematic diagram of the pointing stick device shown in FIG. 4 under an external vertical force. The center-line indicates the vertical direction of the force. When the vertical force ($F_z$) presses on the stick 42, the strain gauges 52 generate a compressive strain signal $S_{z1}$. The cap 50 moves downward a little bit because of the gap 41, causing the cone-shaped mouth 58 to apply a forward force $R_z$. This force $R_z$ compresses the strain gauges 52 to generate an additional strain signal $S_{z2}$. Therefore, when the pointing stick device is pressed in the Z direction, it generates a total strain signal $S_{z1}+S_{z2}$. Consequently, the sensitivity in the perpendicular direction is increased. This increased sensitivity yields a signal that is strong enough to control 3D cursor positioning and button emulation functions.

The pointing stick device 40 increases signal sensitivity in the X, Y and Z directions by way of reaction forces $R_x$, $R_y$ and $R_z$, and thereby generates 3D sensing signals to control the 3D movement of a cursor. These Z direction sensing signals generated by the pointing stick device 40 enable a user to control positioning and function initiation without the click of a button. Because the base stand 56 is made of epoxy, the pointing stick device does not need the collar 28, reducing costs and simplifying assembly. Also, the increased sensitivity of the pointing stick device 40 means that its height can be reduced, making it well-suited for smaller and thinner devices like ultra thin notebooks, palm digital appliances, etc.

The above-mentioned base stand 56 of the pointing stick device 40 is installed between the middle portion 47 of the stick 41 and the cone-shaped mouth, and totally covers the strain gauges 52. An alternative design is that the base stand 56 only partially covers the strain gauges 52; or that the base stand 56 does not extend into the base plate 60. All of these alternative designs also provide increased signal sensitivity in the X, Y and Z directions generated by the strain gauges 52. All of the designs provide an effective detector of horizontal and vertical pressure on the pointing stick device 40.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A pointing stick device comprising:
   a base plate;
   a stick having a top end, a bottom end, and a middle portion between the top end and the bottom end, a portion of the bottom end of the stick being vertically installed at the base plate;
   at least one strain gauge installed around the middle portion of the stick for sensing pressure and generating corresponding sensing signals;
   a cap mounted at the top end of the stick and having a cone-shaped mouth for containing the top end of the stick and the middle portion of the stick; and
   a base stand installed around the middle portion of the stick, the base stand covering at least a portion of the strain gauge, a portion of the base stand being positioned inside the mouth of the cap;
   wherein when an external force is applied to the cap, the force will be transmitted through the mouth of the cap to the portion of the base stand positioned inside the mouth and also to the strain gauge covered by the base stand wherein the strain gauge will sense the force from the cap and generate corresponding sensing signals.

2. The pointing stick device of claim 1 wherein the cap is installed at the top end of the stick in a slightly movable manner so that the cap can rotate a little around the top end of the stick when the external force is exerted on the cap.

3. The pointing stick device of claim 1 wherein a horizontal cross-section of the stick is nearly rectangular, and a strain gauge is installed on each of the four faces of the stick for sensing pressure from various directions and generating corresponding sensing signals.

4. The pointing stick device of claim 1 wherein the base stand is a ringed cone-shaped structure mounted around the middle portion of the stick.

5. The pointing stick device of claim 1 wherein the base stand is made of epoxy.

6. The pointing stick device of claim 1 wherein a plurality of wires are installed at the base plate and are electrically connected to the strain gauge for transmitting the sensing signals from the strain gauge.

7. The pointing stick device of claim 6 wherein the base plate is a printed circuit board (PCB).

* * * * *